United States Patent
Collet et al.

[11] Patent Number: 5,967,587
[45] Date of Patent: Oct. 19, 1999

[54] SLIDING VISOR

[75] Inventors: Corbin L. Collet; Jay B. Price, both of Holland, Mich.

[73] Assignee: Prince Corporation, Holland, Mich.

[21] Appl. No.: 08/826,432

[22] Filed: Mar. 18, 1997

[51] Int. Cl.$^6$ ...................................................... B60J 3/02
[52] U.S. Cl. .......................................... 296/97.11; 16/342
[58] Field of Search ............................... 296/97.9, 97.11, 296/97.12, 97.13; 16/337, 342, 248, 362

[56] References Cited

U.S. PATENT DOCUMENTS

| | | | |
|---|---|---|---|
| 1,625,510 | 4/1927 | Tredwell | 403/52 |
| 2,322,898 | 6/1943 | Van Dresser | 296/97.11 |
| 2,340,015 | 1/1944 | Pelcher et al. | 296/97.11 |
| 2,462,304 | 2/1949 | Burdick | 296/97.12 |
| 2,596,397 | 5/1952 | Greig et al. | 296/97.12 |
| 3,556,585 | 1/1971 | Binder | 296/97.12 |
| 3,765,054 | 10/1973 | Johnson | 16/342 |
| 4,057,287 | 11/1977 | Lilja | 296/97.12 |
| 4,256,388 | 3/1981 | Beyer | 351/158 |
| 4,489,974 | 12/1984 | Warhol | 296/97.5 |
| 4,582,356 | 4/1986 | Kaiser et al. | 296/97.11 |
| 4,617,699 | 10/1986 | Nakamura | 16/262 |
| 4,925,233 | 5/1990 | Clark | 296/97.11 |
| 4,964,193 | 10/1990 | Rommelfaenger et al. | 16/225 |
| 4,998,765 | 3/1991 | Van Order et al. | 296/97.11 |
| 5,044,687 | 9/1991 | Abu-Shumays et al. | 296/97.11 |
| 5,161,850 | 11/1992 | Redder et al. | 296/97.11 |
| 5,409,285 | 4/1995 | Snyder et al. | 296/97.11 |
| 5,491,874 | 2/1996 | Lowry et al. | 16/342 |
| 5,645,308 | 7/1997 | Fink | 296/97.9 |
| 5,653,490 | 8/1997 | Fink et al. | 296/97.11 |

FOREIGN PATENT DOCUMENTS

| | | |
|---|---|---|
| 57-140222 | 8/1982 | Japan . |
| 1354485 | 5/1974 | United Kingdom ................ 296/97.12 |

*Primary Examiner*—Andrew C. Pike
*Attorney, Agent, or Firm*—Price, Heneveld, Cooper, DeWitt & Litton

[57] ABSTRACT

The visor system of the present invention provides a unique visor control and visor in which a two-piece control receives an elongated pivot rod. The combined torque control and slide permit the visor panel to slide with respect to the pivot rod and comprises a lubricous polymeric slide which extends around the visor rod to provide a sliding interface between the visor rod and a torque spring which surrounds the polymeric member and allows the visor to be moved to desired adjusted positions. In a preferred embodiment of the invention, the slide comprises a segmented and partially split polymeric sleeve surrounding the visor rod. An adjustable cylindrical steel torque spring surrounds the sleeve and is secured to the visor body for providing the desired visor rotation and sliding action.

23 Claims, 3 Drawing Sheets

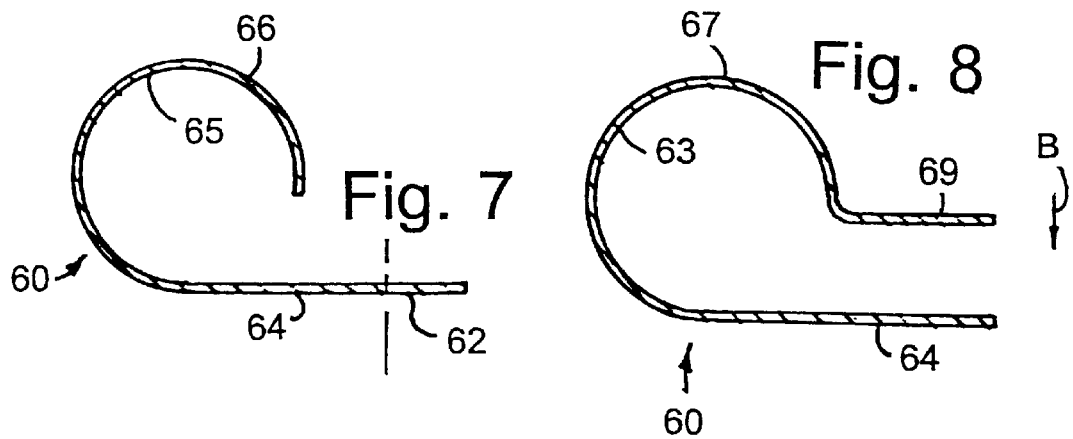
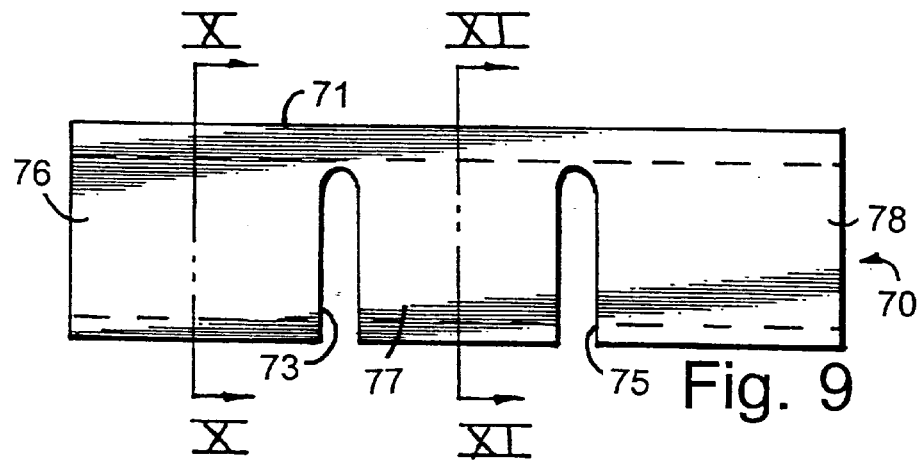
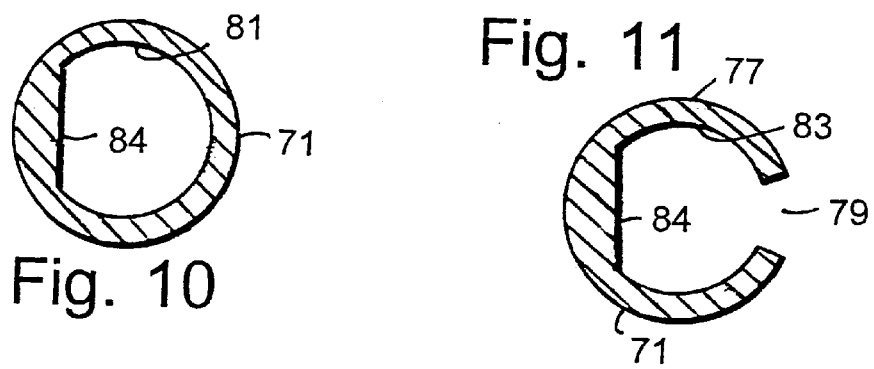

SLIDING VISOR

BACKGROUND OF THE INVENTION

The present invention relates to vehicle visors and particularly to a visor which is adjustable along its longitudinal axis.

There exists a variety of visors which can provide front and side window protection against incident sunlight. Conventional single visor installations typically provide a visor which can be pivoted from the windshield position to the side window position but are not normally otherwise adjustable along the axis of the visor pivot rod. To provide such adjustability, several sliding visors have been developed, including those disclosed in U.S. Pat. Nos. 4,925,233, 4,998,765, 5,161,850, 5,409,285, and 5,653,490. Although these visors provide the desired additional sun-blocking protection by allowing a visor to move along the longitudinal axis of the pivot rod to which it is mounted, the somewhat heavy polymeric core construction and/or the additional guide means somewhat complicate and increase the cost of the structure. Further, it is desired to reduce the complexity of controls for such visor constructions and integrate in a control the somewhat competitive forces required to provide a holding rotational torque for the visor and yet allow the visor to slide along the visor rod. In order to provide a less costly, easy to manufacture visor of lightweight construction, the improved sliding visor construction and control of the present invention have been developed.

SUMMARY OF THE PRESENT INVENTION

The visor system of the present invention provides a unique visor control and visor in which a two-piece control receives an elongated pivot rod. A combined torque spring and slide permit the visor panel to slide with respect to the pivot rod. A lubricous polymeric slide extends around the visor rod to provide a sliding interface between the visor rod and the control while a torque spring surrounds the polymeric slide and allows the visor to be moved to desired adjusted positions between a raised stored position adjacent the vehicle roof and lowered use positions.

In a preferred embodiment of the invention, the slide comprises a segmented and partially split polymeric sleeve surrounding the visor rod. A segmented partially split cylindrical steel torque spring surrounds said sleeve and is secured to the visor body for providing the desired visor rotation and sliding action. Such a control permits tolerance variations in the manufacture of the visor control. With such construction, therefore, an improved inexpensive sliding visor is provided which allows the use of a lightweight core material and provides a slidably adjustable visor for improved sun-blocking efficiency.

These and other features, objects, and advantages of the present invention will become apparent upon reading the following description thereof together with reference to the accompanying drawings.

BRIEF DESCRIPTION OF THE DRAWINGS

FIG. 7 is a cross-sectional view of the torque spring taken along section line VII—VII of FIG. 6;

FIG. 8 is a cross-sectional view of the torque spring taken along section line VIII—VIII of FIG. 6;

FIG. 9 is a front elevational view of the polymeric sleeve shown in FIGS. 4 and 5;

FIG. 10 is a cross-sectional view of the polymeric sleeve taken along section line X—X of FIG. 9; and FIG. 11 is a cross-sectional view of the polymeric sleeve taken along section line XI—XI of FIG. 9.

DETAILED DESCRIPTION OF THE PREFERRED EMBODIMENT

Figure 1:
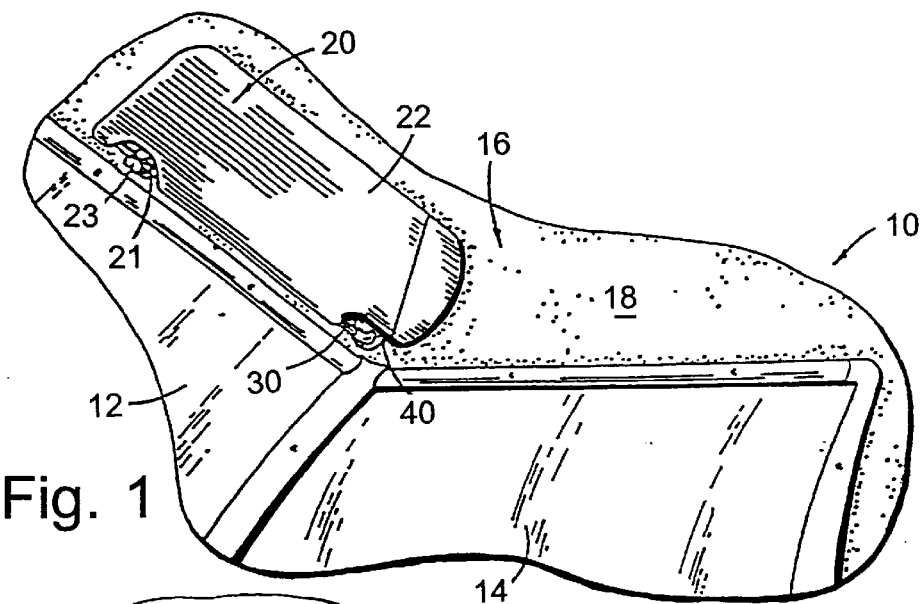
FIG. 1 is a fragmentary perspective view of a vehicle including a visor embodying the present invention shown in a raised stored position against the vehicle headliner.
Figure 2:
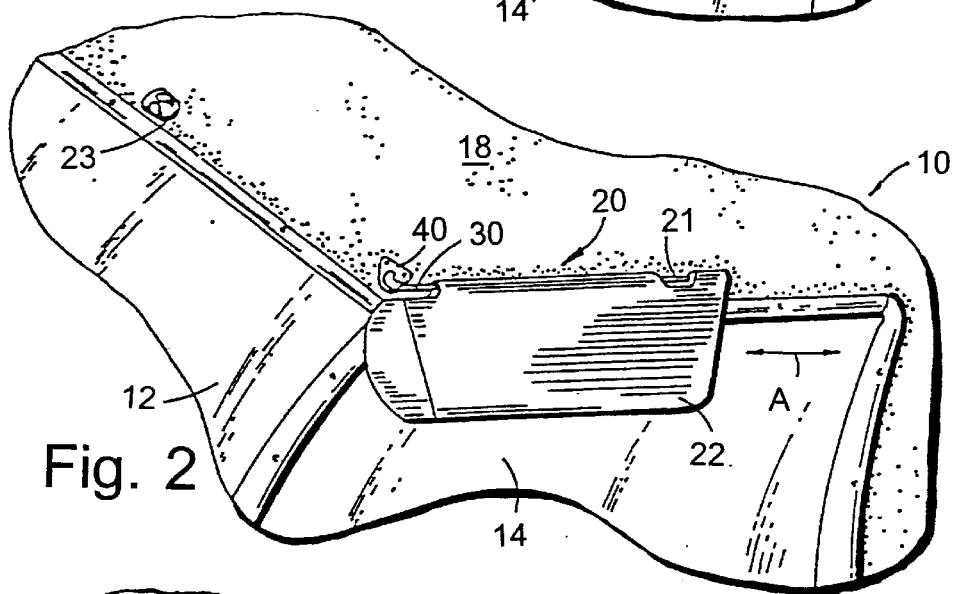
FIG. 2 is a fragmentary perspective view of the visor shown in FIG. 1, shown in a lowered first side window use position.
Figure 3:
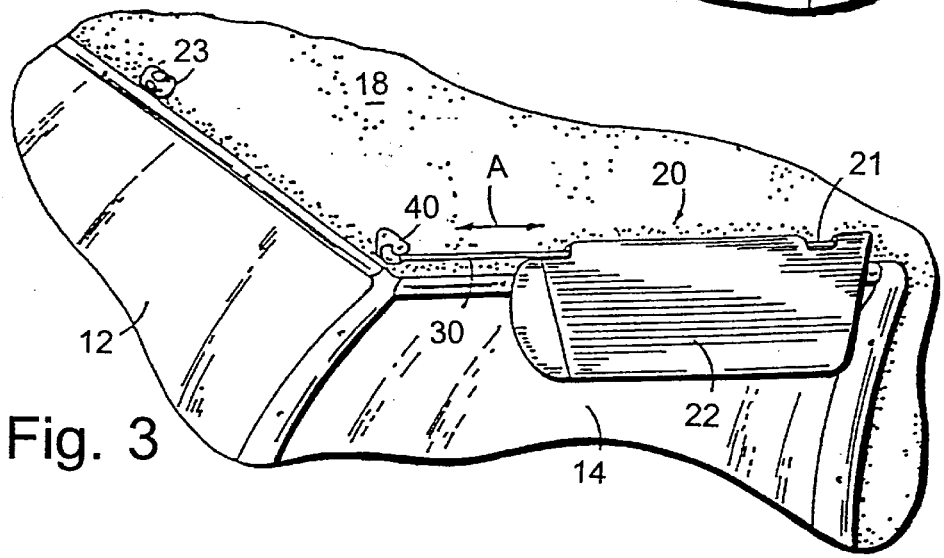
FIG. 3 is a fragmentary perspective view of the visor shown in FIG. 2, shown in a second use position, adjusted with respect to the visor rod.

Referring initially to FIGS. 1–3, there is shown a vehicle 10 having a windshield 12, passenger right side window 14, and a roof 16, typically covered with a preformed headliner 18. Mounted to the passenger side of the vehicle, as shown in the fragmentary perspective view of these figures, is a visor assembly 20 which includes a visor 22 having an upholstered, folded, butterfly-shaped core, as described in greater detail below. The visor 22 is pivotally and slidably mounted to a pivot rod 30 which, in turn, is mounted to a conventional elbow mounting bracket 40. The elbow bracket 40 permits the visor rod 30 and visor slidably mounted thereon to be pivoted from the front windshield position, as illustrated in FIG. 1, to the side window position, as illustrated in FIGS. 2–3, in a conventional manner. The visor includes a secondary visor clip 21 which snap-fits within a socket 23 mounted to the roof of the vehicle in spaced relationship to bracket 40 for supporting the visor in the stored position illustrated in FIG. 1. A similar visor (not shown) is mounted to the driver's side of the vehicle.

The visor 22 can be moved along the visor rod 30 along its longitudinal axis as illustrated by arrow A in FIGS. 2 and 3 for providing adjustment of the visor along the side window (or windshield once released from socket 23) to optimize the blocking of incident sunlight. The visor is mounted to the pivot rod 30 by an improved visor control assembly 50 as illustrated in FIGS. 4–11, which not only permits the visor to slidably move along the visor rod, but also permits the storage of the visor in the position shown in FIG. 1, as well as holding the visor in any desired lowered selected use position pivoted about rod 30 or slidably adjusted therealong. The construction of the visor control to accomplish this is best seen by reference to FIGS. 4–11, now described.

The visor 22 is made from a relatively thin fiberboard 24 die cut in the shape of a butterfly with an upholstery material 25 (FIG. 5) surrounding its outer surface and folded over the edges. The butterfly-shaped core integrally includes a pair of panels which are folded along top edge 26 of the visor and suitably bonded along the mating peripheral edges after the insertion of the visor rod and control 50 of the present invention. This core construction and its upholstering can be of the type disclosed in greater detail in U.S. Pat. No. 5,161,850, the disclosure of which is incorporated herein by reference.

Figure 4:
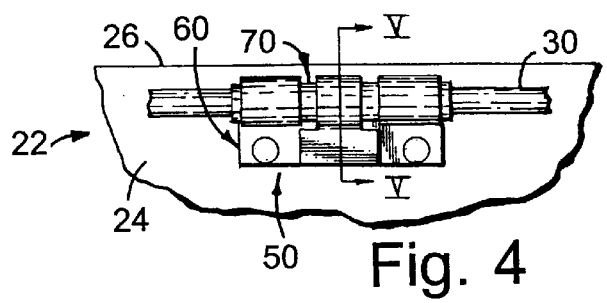
FIG. 4 is a fragmentary, partly broken away, front elevational view of a visor control embodying the present invention.
Figure 5:
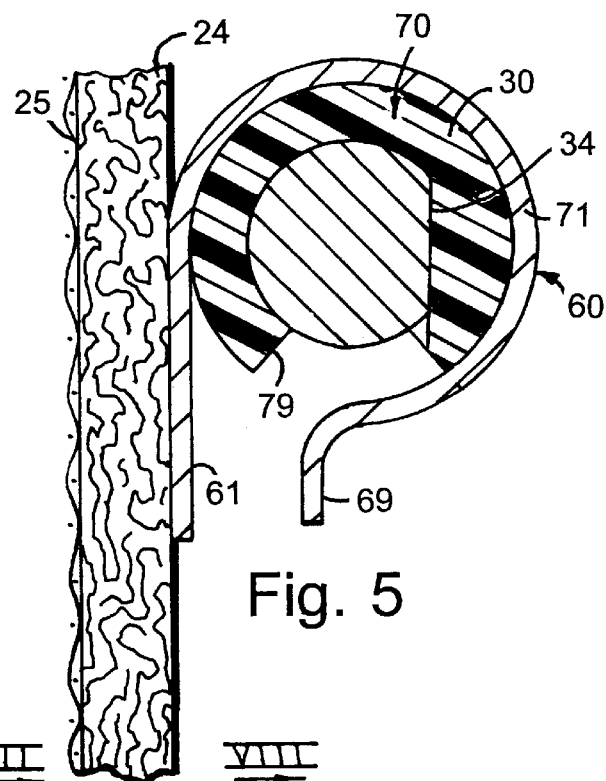
FIG. 5 is a greatly enlarged fragmentary cross-sectional view of the visor control taken along section line V—V of FIG. 4.
Figure 6:
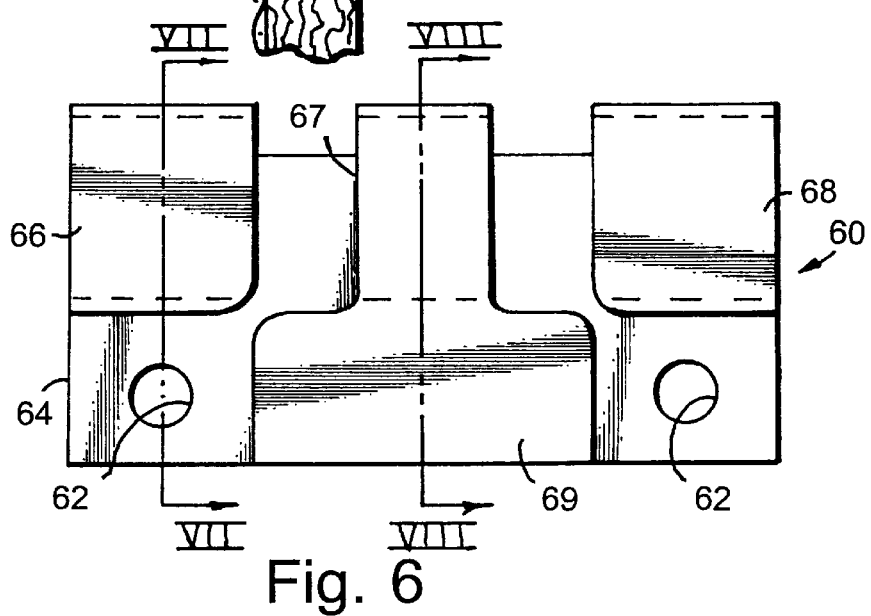
FIG. 6 is an enlarged front elevational view of the torque spring, shown also in FIGS. 4 and 5.

The visor control 50 of the present invention includes, as initially seen in FIGS. 4 and 5, a tubular torque spring 60 surrounding a sleeve 70 constructed of a lubricious polymeric material, which, in turn, is slidably mounted to the pivot rod 30. As best initially seen in FIGS. 4 and 5, he pivot rod 30 is made of steel and is keyed by a flat 34 or other geometric shape to prevent the rotation of the polymeric sleeve 70. Sleeve 70 has an internal shape as described in greater detail below in connection with FIGS. 9–11, which engages flat 34 to prevent rotation of the sleeve around the pivot rod while allowing the sleeve and torque control 50 attached to the visor body 24 to slide along pivot rod 30.

Surrounding the polymeric sleeve 70 is the visor torque spring 60 which is anchored to the visor body 24 by means of suitable fasteners or by a bonding adhesive. In the case of fiberboard material employed, fasteners, such as rivets 61, extending through apertures 62 (FIG. 6) in the torque spring 60 can be employed. The torque spring 60 is longitudinally fixed around sleeve 70 but rotates around the outer generally cylindrical surface 71 of sleeve 70 in a controlled manner which can be selected, as described below, to allow the visor to be raised to a stored position against the headliner of the vehicle or lowered to selected use positions. Thus, the sleeve 70 provides a sliding interface between the visor body and rod 30 while the torque spring 60 provides the rotational adjustment of the visor about sleeve 70. The torque spring 60 is shown in detail in FIGS. 6–8 and is now described.

Torque spring 60 is constructed of steel and has a thickness of about 0.05 inches and suitably treated for the automotive environment. It comprises a back wall 64 which is substantially flat and rectangular and includes a pair of apertures 62 or other fastening means for attaching the torque control in a fixed relationship to the visor body adjacent the upper edge 26, as seen in FIG. 4. The torque spring includes a pair of opposed end semicylindrical collars 66 and 68, which extend over the corresponding ends 76, 78 (FIG. 9) of split sleeve 70. The semicylindrical collars 66, 68 of torque spring 60 are roll-formed to provide an inner diameter 65 which snugly engages sleeve 70. The center of torque spring 60 includes a center semicylindrical adjustable collar 67 terminating in a tang 69, which extends over a center section 77 (FIG. 9) of the split sleeve 70. Tang 69 can be depressed downwardly in a direction indicated by arrow B in FIG. 8 to provide an adjustable and selectable rotational torque for the torque spring 60 around the outer diameter 71 of sleeve 70 and/or adjust the sliding friction between sleeve 70 and rod 30. Thus, the shape of the inner surface 63 of adjustable collar 67 can be changed by pressure on the tang to deform the center collar 67 to increase or decrease the desired torque depending upon the visor with which the control is employed.

The details of the split sleeve 70 are shown in FIGS. 9–11 in which the generally cylindrical outer diameter 71 of the sleeve is shown with the center collar 77 including a longitudinally extending split or opening 79 (FIGS. 5 and 11) which allows the tang 69 to also adjust the sliding resistance which sleeve 70 applies to pivot rod 30. The end cylindrical collars 76, 78 are spaced from center split collar 77 by slots 73 and 75 formed through the cylindrical sleeve 70 and circumscribing an arc of approximately 270° of the cylindrical sleeve. The inner diameter 81 of sleeve 70 includes a flat 84 which engages the flat 34 on pivot rod 30 to lockably mount sleeve 70 to the pivot rod against rotation about the longitudinal axis of the rod while allowing sliding movement along the longitudinal axis of the rod. The cylindrical section 83 of the center adjustable collar 77 has a diameter which is selected by the gap width 79, in turn, controlled by the tang 69 of torque spring 60. As can be appreciated, the torque spring 60 tends to provide a higher torque in a holding direction for the visor than in a direction opposite (i.e., holding the visor against the vehicle headliner) from the raising of the visor from the lowered adjusted position. This is due to the tendency of the torque spring 60 to tighten or wrap around the sleeve 70 as the control is moved into a lowered position and unwrap as the visor is moved toward a raised position. When the visor is stationary, however, the adjustment force provided by tang 69 against sleeve 70 and the split sleeve collar 77 against rod 30 controls both the holding torque of the visor with respect to the pivot rod as well as the sliding friction allowing the visor to be slid easily along the visor rod and yet retain its adjusted position during movement of the vehicle. By providing both a split torque spring 60 and split polymeric sleeve 70 which is made of a suitable polymeric material, such as an acetyl resin like DELRIN® manufactured by E. I. du Pont Nemours and Company, the desired rotational torque and sliding friction is selectively achieved for any visor shape utilizing the two-piece construction of the torque control 50. Sleeve 70, in the preferred embodiment, has a thickness of about ⅛ inch and a length along its longitudinal axis of about 2 inches.

Various modifications to the preferred embodiment of the invention as described herein can be made by those skilled in the art without departing from the spirit or scope of the invention as defined by the appended claims.

The embodiments of the invention in which an exclusive property or privilege is claimed are defined as follows:

1. A sliding visor assembly comprising:
   a visor body;
   a visor pivot rod for mounting said visor body to a vehicle, said rod defining a longitudinal axis; and
   a torque control coupling said pivot rod to said visor body wherein said torque control comprises a split polymeric sleeve mounted to said pivot rod to allow said sleeve to slide along said pivot rod and including an interengaging surface preventing rotation of said sleeve around the longitudinal axis of said rod, and a torque spring surrounding said sleeve and including an adjustable collar engaging said sleeve for adjusting a rotational torque of said torque spring around said polymeric sleeve and a sliding friction of said sleeve with respect to said rod.

2. The visor assembly as defined in claim 1 wherein said sleeve is provided with a longitudinally oriented split and comprises a pair of generally cylindrical end collars and a center split collar isolated from said end collars by slots formed into a sidewall of said sleeve.

3. The visor assembly as defined in claim 2 wherein said slots circumscribe an arc of approximately 270° of said sidewall of said sleeve.

4. The visor assembly as defined in claim 3 wherein said center split collar of said sleeve defines a longitudinal axis and includes a notch formed along the longitudinal axis of said sleeve to define a pair of flexible semicylindrical legs circumscribing said pivot rod, said legs applying pressure to said rod.

5. The visor assembly as defined in claim 4 wherein said torque spring further includes a pair of semicylindrical end collars surrounding said end collars of said sleeve, said torque spring further including a center semicylindrical collar terminating in a tang, said center collar of said torque spring being aligned with said split collar of said sleeve and deformable in an adjustable manner to adjust the rotational torque of said torque spring around said sleeve and the pressure applied by said legs of said sleeve on said rod for adjusting the sliding friction of said sleeve along said rod.

6. The visor assembly as defined in claim 5 wherein said torque spring is made of spring steel.

7. A visor torque control comprising:
- a polymeric sleeve for mounting to a pivot rod to allow said sleeve to slide along the pivot rod and including an interengaging surface preventing rotation of said sleeve around a longitudinal axis of the pivot rod, said sleeve further including a section with at least one adjustable leg at least partially surrounding said rod; and
- a torque spring surrounding said sleeve and including an adjustable collar engaging said leg of said sleeve for adjusting a rotational torque of said torque spring around said polymeric sleeve and a sliding friction of said sleeve with respect to the rod.

8. The torque control as defined in claim 7 wherein said sleeve is provided with a longitudinally oriented split and comprises a pair of generally cylindrical end collars and said section, said section having a center split collar isolated from said end collars by slots formed into a sidewall of said sleeve.

9. The torque control as defined in claim 8 wherein said slots circumscribe an arc of approximately 270° of said sidewall of said sleeve.

10. The torque control as defined in claim 9 wherein said center collar of said sleeve defines a longitudinal axis and includes a notch formed along the longitudinal axis of said sleeve to define a pair of flexible semicylindrical end legs circumscribing said pivot rod, said end legs applying pressure to said rod.

11. The torque control as defined in claim 10 wherein said torque spring further includes a pair of semicylindrical end collars surrounding said end collars of said sleeve, said torque spring further including a center semicylindrical collar terminating in a tang, said center collar of said spring being aligned with said split collar of said sleeve and deformable in an adjustable manner to adjust the rotational torque of said torque spring around said polymeric sleeve and the pressure applied by said end legs of said sleeve on said rod for adjusting the sliding friction of said sleeve along said rod.

12. The torque control as defined in claim 11 wherein said torque spring is made of spring steel.

13. The torque control as defined in claim 12 wherein said polymeric sleeve is made of an acetyl resin.

14. A visor control comprising:
- a pivot rod having a flat formed thereon;
- a polymeric sleeve mounted to said pivot rod to allow said sleeve to slide along said pivot rod and including an interengaging surface engaging said flat for preventing rotation of said sleeve around a longitudinal axis of said rod, said sleeve further including a pair of spaced end collars extending around said rod and a center collar having at least one movable leg at least partially surrounding said rod; and
- a torque spring surrounding said sleeve and including an adjustable collar engaging said leg of said sleeve for adjusting a rotational torque of said torque spring around said polymeric sleeve and a sliding friction of said sleeve with respect to said rod.

15. The visor control as defined in claim 14 wherein said sleeve is provided with a longitudinally oriented split and defines said end collars that are generally cylindrical and said center collar that is longitudinally split and isolated from said end collars by slots formed into a sidewall of said sleeve.

16. The visor control as defined in claim 15 wherein said slots circumscribe an arc of approximately 270° of said sidewall of said sleeve.

17. The visor control as defined in claim 16 wherein said center collar of said sleeve defines a longitudinal axis and includes a notch formed along the longitudinal axis of said sleeve to define a pair of flexible semicylindrical end legs circumscribing said pivot rod, said end legs applying pressure to said rod.

18. The visor control as defined in claim 16 wherein said torque spring further includes a pair of semicylindrical end collars surrounding said end collars of said sleeve, said torque spring flirter including a center semicylindrical collar terminating in a tang, said center collar of said spring being aligned with said center collar of said sleeve and deformable in an adjustable manner to adjust the rotational torque of said torque spring around said polymeric sleeve and the pressure applied by said end legs of said sleeve on said rod for adjusting the sliding friction of said sleeve along said rod.

19. The visor control as defined in claim 18 wherein said torque spring is made of spring steel.

20. The visor control as defined in claim 19 wherein said polymeric sleeve is made of an acetyl resin.

21. The visor control as defined in claim 14 wherein said sleeve has a thickness of about ⅛ inch.

22. The visor control as defined in claim 21 wherein said sleeve has a length of about 2 inches.

23. The visor control as defined in claim 14 wherein said torque spring is made of spring steel having a thickness of about 0.05 inch.

\* \* \* \* \*

UNITED STATES PATENT AND TRADEMARK OFFICE
CERTIFICATE OF CORRECTION

PATENT NO.    : 5,967,587
DATED         : October 19, 1999
INVENTOR(S)   : Collet et al.

It is certified that error appears in the above-identified patent and that said Letters Patent is hereby corrected as shown below:

Column 4, line 5;

"from" (first occurrence) should be --than--.

Column 6, line 32;

"flirter" should be --further--.

Signed and Sealed this

Thirtieth Day of May, 2000

Attest:

Q. TODD DICKINSON

*Attesting Officer*    *Director of Patents and Trademarks*